(12) United States Patent
Kimmet

(10) Patent No.: US 8,857,886 B2
(45) Date of Patent: Oct. 14, 2014

(54) VEHICLE OPENINGS

(71) Applicant: Stephen G. Kimmet, Tiffin, OH (US)

(72) Inventor: Stephen G. Kimmet, Tiffin, OH (US)

( * ) Notice: Subject to any disclaimer, the term of this patent is extended or adjusted under 35 U.S.C. 154(b) by 0 days.

(21) Appl. No.: 13/662,415

(22) Filed: Oct. 27, 2012

(65) Prior Publication Data

US 2014/0117708 A1   May 1, 2014

Related U.S. Application Data

(63) Continuation of application No. 13/172,213, filed on Jun. 29, 2011, now Pat. No. 8,317,252, which is a continuation-in-part of application No. 11/069,252, filed on Mar. 1, 2005, now Pat. No. 7,992,916.

(60) Provisional application No. 60/549,294, filed on Mar. 2, 2004.

(51) Int. Cl.
*B62D 25/10* (2006.01)
*B60J 10/12* (2006.01)

(52) U.S. Cl.
USPC .......................................... 296/100.1; 296/76

(58) Field of Classification Search
USPC .............. 296/37.6, 26.11, 76, 100.1
See application file for complete search history.

(56) References Cited

U.S. PATENT DOCUMENTS

| | | | |
|---|---|---|---|
| 6,641,201 B1 * | 11/2003 | Pietryga et al. | 296/100.1 |
| 6,783,170 B1 * | 8/2004 | Van Den Acker et al. | 296/146.16 |
| 7,055,879 B2 * | 6/2006 | De Gaillard | 296/26.08 |
| 2002/0008396 A1 * | 1/2002 | De Gaillard | 296/26.09 |
| 2005/0073167 A1 * | 4/2005 | De Gaillard | 296/76 |
| 2005/0206185 A1 * | 9/2005 | Kimmet | 296/76 |

* cited by examiner

*Primary Examiner* — Glenn Dayoan
*Assistant Examiner* — Sunsurraye Westbrook

(57) ABSTRACT

Added openings are provided for sport utility vehicles (SUV), pick-up trucks, two and four door vehicles, vans, minivans, sedans, station wagons, or other vehicles. The opening(s) may utilize doors, gates, windows, sunroofs, or lids that provide more physical and/or visual access to the interior space, cargo, and/or seating within the vehicles that currently are not easily accessible, viewed, seen-by, or displayed-on conventional opening means. These openings may also provide the ability to place cargo within the space of the vehicle that current vehicles prohibit from being carried therein, or they may provide decorative, descriptive, or electronic displays for such vehicles, for example, advertising on taxi cabs. Among the embodiments, this invention results in a new 2 door or a 4 door SUV vehicle having added rear side doors, and a new 2 door or 4 door sedan that in effect functions likes a pick-up.

17 Claims, 8 Drawing Sheets

VEHICLE OPENINGS

RELATED APPLICATIONS

This application claims the benefit, under 35 U.S.C. §119(e) of U.S. Provisional Patent Application Ser. No. 60/549,294, filed Mar. 2, 2004 under 35 U.S.C. §111(b), and is a continuation application of and claims benefit, under 35 U.S.C. §120, of U.S. patent application Ser. No. 13/172,213, filed Jun. 29, 2011, now U.S. Pat. No. 8,317,252, issued Nov. 27, 2012, which is a continuation in part application of and claims benefit, under 35 U.S.C. §120, of U.S. patent application Ser. No. 11/069,252, Mar. 1, 2005, now U.S. Pat. No. 7,992,916, issued Aug. 9, 2011, which applications and patents are incorporated herein in their entirety.

BACKGROUND OF THE INVENTION

The present invention generally relates to added vehicle openings and more particularly to added doors, gates, windows, and lids in doors, sides, truck gates, and trunk lids of vehicles. Most particularly, the present invention relates to added doors, gates, windows, and lids in doors, sides, truck gates, windows, a sunroof, and trunk lids for more access to space and seats, visual view-through or display-on, and portability of cargo in vehicles.

Typically in the past, sport utility vehicles (SUVs), pickup trucks, two door and four door automobiles, vans, minivans, station wagons, or other vehicles, have had one or two doors, toward the front of the vehicle, on each side and possibly a rear access means to enter, see through, and/or port cargo within the vehicle. However, there are, for example, space, third row seats, viewing areas, and/or cargo, that are currently difficult to get to, see, see through, or port by current physical and visual access, and portability means in such vehicles.

In an attempt to overcome some of these difficulties, various means are utilized, for example, a single trunk lid, conventional four doors, a truck gate, a backlite (with or without a slider), a rear hatch, a fold down or slide-away second row seat, and an internal vehicle pathway. Still, there remains a need to better physically and visually gain access to and through the space and seating, and to port cargo in the above-mentioned vehicles.

Thus, those skilled in the art continue to seek solutions to the problems of how to provide better access or visually seeing-through or displaying-on, to/of areas, cargo, and seating, and to port cargo in vehicles.

SUMMARY OF THE INVENTION

The present invention provides an added/new opening(s) for sport utility vehicles, pick-up trucks, two and four door vehicles, vans, minivans, station wagons, or other vehicles. The opening(s) may utilize doors, gates, windows, a sunroof, or lids that provide more access or visual seeing-through or displaying-on areas, to/over the interior space, cargo, and/or seating within the vehicle that are in the space that is currently less accessible by conventional opening means. These openings, with or without doors, gates, windows, a sunroof, or lids, may also provide visual seeing-through or displaying-on, or an ability to place cargo within the space of the vehicle that current vehicles constrict or prohibit from being carried therein.

The openings of the present invention may utilize types of door(s), gate(s), window(s), a sunroof, or lid(s) that are, for example, conventionally hinged that pivot from back to front, from front to back, from one side to the other, or vertically up or down. The openings may also utilize doors, gates, windows, or lids that are conventional sliding doors, gates, windows, or lids that move up, down, or protrude out of the doorframe and then slide either forward or backward along the side of the vehicle. These doors, gates, or lids may be on only one side or on a lid or a gate of the vehicle, or there could be doors, gates, windows, or lids on both sides, or on body panels, lids, a sunroof, or gates of the vehicle. The doors or lids may be the same on both sides or different on each side, gate, or lid. Any combination of the number of added door(s), gate(s), window(s) or lid(s) or the types of doors, gates, windows, or lids may be practiced in the instant invention without departing from its spirit or scope.

The doors, gates, windows, or lids may also be expandable, rollable, retractable, and/or removable that can be manually or automatically opened or closed. The doors, gates, windows, sunroof, or lids may comprise metal, plastic, glass, wood, or other suitable material.

Also provided is a trunk for vehicles in the form of a "trunk bed," which is a discovery of the instant invention. In such vehicles the trunk functions much like a bed of a pick-up truck, for example, having embossed metal with channel ridges to give the trunk bed more durability and strength. The trunk may have a lid that looks and functions similar to a conventional lid, or the lid or a trunk back panel may be provided with a gate similar to a pick-up truck gate, but when the lid is removed, collapsed, rolled out of the way of the trunk opening, the trunk gate may be lifted or dropped, or by other means to expose the trunk or possibly the trunk bed. The trunk gate of a particular vehicle may also be capable of being either raised or lower at an operator's choosing. The trunk can then function in a manner similar to a pick-up truck bed.

Further objects and advantages of the present invention will be apparent from the following description and appended claims, reference being made to the accompanying drawings forming a part of a specification, wherein like reference characters designate corresponding parts of several views.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
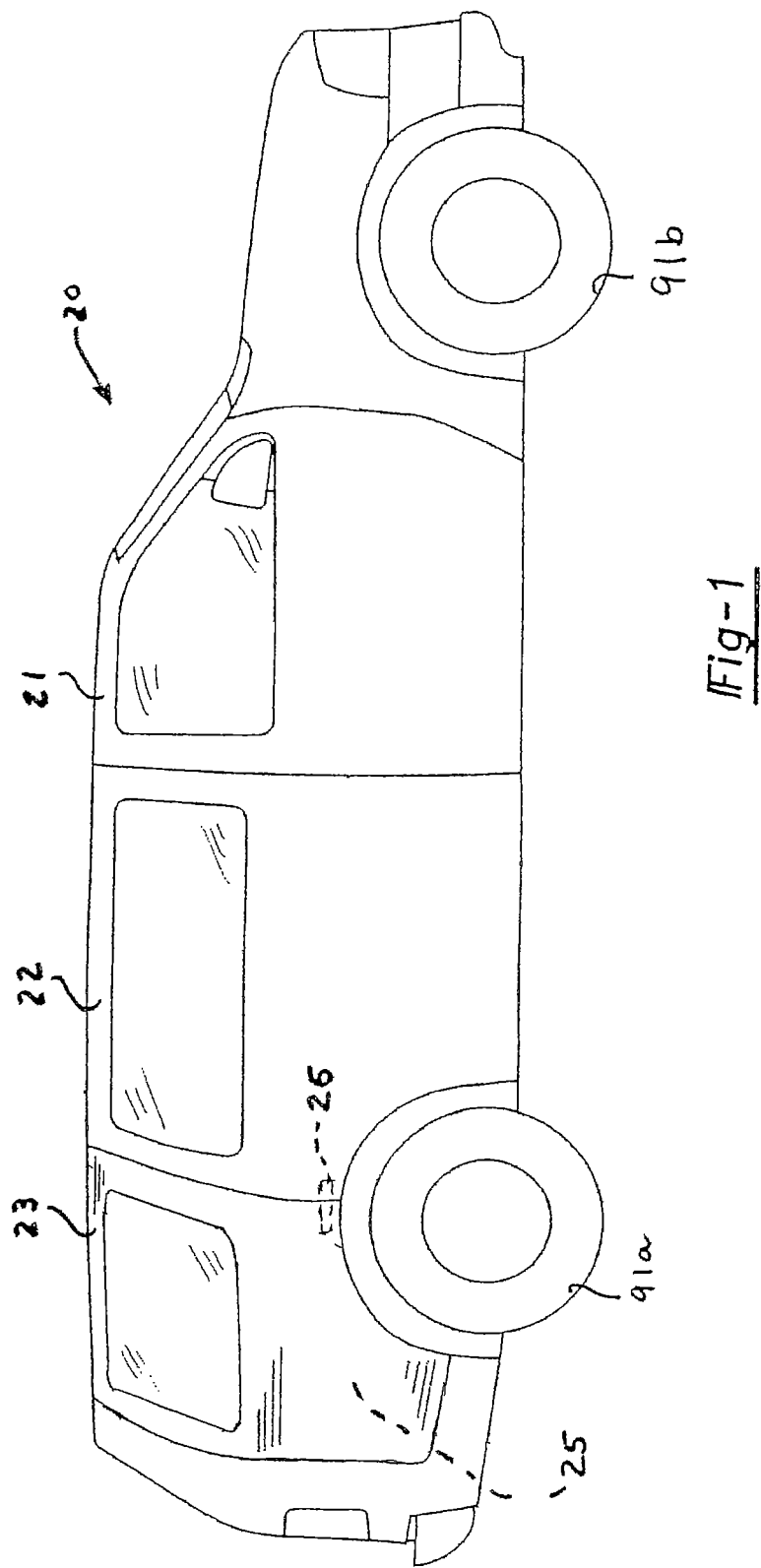
FIG. 1 is a side view of a sport utility/minivan/van type vehicle in accordance with the present invention.

Referring to FIG. 1, there is illustrated a particularly preferred embodiment of a side view of a sport utility vehicle (SUV)/minivan/van/station wagon type vehicle in accordance with the present invention, generally indicated by the numeral 20. As illustrated in FIG. 1, the vehicle 20 has front side door 21 and another (second) side door 22 that is just behind the front door 21, on both sides thereof, but this vehicle 20 embodiment could also comprise a single front door 21 on both sides thereof, for example, a "sport" version of an SUV, like the Ford Escape Sport model. Also shown in FIG. 1 is an added rear door 23 that is a discovery of the present invention.

Although not wishing to be limited to only the following example manufacturers and models of sport utility (SUV)/minivan/van/station wagon type vehicles, the sport utility (SUV)/minivan/van/station wagon type vehicles 20 of the present invention possess the dimensional, design, and functional characteristics of the current (2005) models (which would be modified to have at least one of the embodiments of present invention): the SUVs—Ford Escape, Ford Expedition, Ford Excursion, Chevrolet Blazer, Chevrolet Trail Blazer, and the Dodge Durango; the minivans—Ford Freestar, Chevrolet Astro, and Chevrolet Venture; the vans—Ford E-Series and Chevrolet Express; and the station wagon—Ford Freestyle.

It is to be appreciated that all of vehicles 20, 30, 40, 50, 50', 60, 70, and 70' of the present invention are not limousines or "stretch" versions of the vehicles depicted or described. The vehicles 20, 30, 40, 50, 50', 60, 70, and 70' of the present invention are those currently produced as the examples herein are designed. The vehicles 20, 30, 40, 50, 50', 60, 70, and 70' are not those associated with vehicles of the past, which had short, stubby, or substantially sloping trunks, trunk seats, and other features that are not possessed by the examples given for the specific type vehicles.

Examples of body styles and physical features of the vehicles 20, 30, 40, 50, 50', 60, 70, and 70' are the comparable shapes and dimensions of height, length, and/or width of the trunk, the comparable shapes and dimensions of height, width, and/or length of the vehicles 20, 30, 40, 50, 50', 60, 70, and 70', and the function of the vehicle 20, 30, 40, 50, 50', 60, 70, and 70' (like transporting people and/or cargo, and to advertise products).

Depending on the configuration of the side of the vehicle, the added door 23 may or may not span a rear wheel 91a of the vehicle and may be provided on one of the sides of the vehicle 20 or on both sides. Also, a step, running board, and/or body panel (not shown) that may cover a portion of the rear wheel 91a may be included for gaining access or for leaving the vehicle 20 by means of the rear door 23. Although shown and possible, it is, however, not necessary that the doors 21-23 abut one another, as many vehicles do.

Also shown in FIG. 1 is an electrical or mechanical interlock mechanism 26 in accordance with the present invention that may be utilized to assure that the second side door 22 and the rear door 23 do not interfere with one another. For example, the rear door 23 may be a hinged door that would pivot away from the vehicle 20, while the second door 22 may be a sliding door that first moves out (protrudes) from the vehicle 20 and then slides on a track (not shown) toward the rear of the vehicle 20. If the rear door 23 was to swing open, with the second door 22 at least partially open, the two doors 22, 23 may hit one another and cause damage to one or both doors 22, 23. With the interlock 26 in place, if one of the doors 22, 23 is in at least a partially open position, then the other door 23, 22 would be prevented from opening, thus preventing damage and possible injury to occupants or potential occupants. The interlock 26 may be any suitable mechanism known in the art and may be applied to any combination of the opening, door, lid, gate, sunroof, and window of the present invention.

The rear door 23, which may also be embodied as a lid, a door-window (which opens and allow people, animals, or cargo to enter and leave), or gate in the present invention (as well as any added opening in the present invention) can be realized as pivoting on hinges, sliding, expanding and folding and retracting (like the 1959 Ford automobile top that collapsed into its trunk or a currently available Chevrolet SSR pick-up truck top that collapses into its trunk), rolling (possibly similar to a roll-top desk top), swing upwardly like a Delorean, coiling, or be spring loaded, or moved up or down and away from the vehicle 20, or from back to front, from front to back, from one side to the other, or come off of the vehicle, still remains within the spirit and scope of the invention. The doors, gates, windows, or lids 23 may also be, for example, lockable, latchable (see, for example, latches and locks 88'-88''''', displayed-on, spring loaded and/or to roll as conventional sliding doors, gates, windows, sliders, or lids that move out of the doorframe and then slide either backward or forward (which is a discovery of the present invention) along the side of the vehicle.

The added door, gate, or lid 23 is not limited to having a window therein, or by its shape or its size as it serves the need to physically or visually access or display-on cargo, space, and/or seating 25 in the vehicle. However, with the rear door 23, passengers do not have to get into or out of a third row of seats in the vehicle 20 by way of the second door 22 or a rear hatch or door (not shown), which typically causes those passengers to contort and/or squeeze in and out of the vehicle 20 with much difficulty. A step or running board (neither which are shown but are common in the art) may be utilized to assist an occupant in entering or leaving the vehicle 20 through door 23. It is also a discovery of the present invention that the door 23 may slide forward on the vehicle and exposed both the rear and the middle portion of the vehicle 20, while not having a middle door 22 at all, thus allowing access to both middle and rear areas of the vehicle 20, that no other vehicle does.

Figure 2:
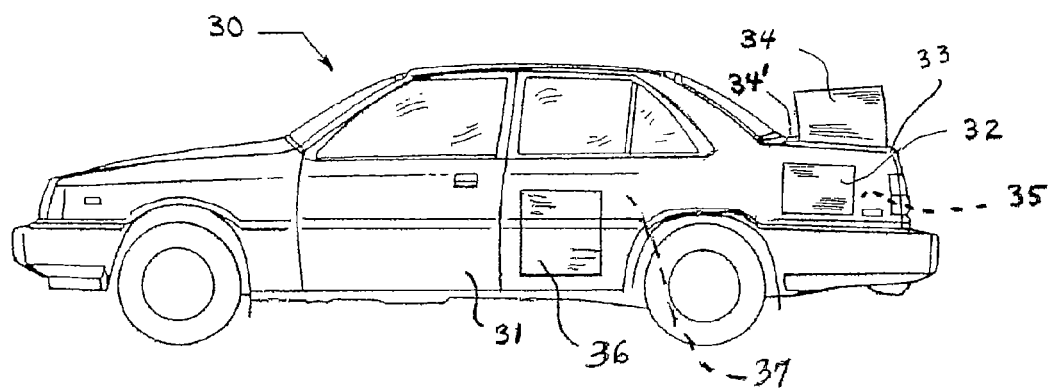
FIG. 2 is a side view of a two door automobile in accordance with the present invention.

The preferred embodiments of FIG. 2 are directed to a two door automobile 30 having a single door 31 on both sides thereof. The doors 31 being in the front portion of the two door automobile 30, which is not a coupe type of vehicle like the Chevrolet SSR pick-up truck. In accordance with the present invention, there is added to the vehicle 30 a side door, gate, window, or lid 32 to a trunk area 35 of the vehicle 30 and/or possibly a side door, gate, window, or lid 36 to the body panel behind the door 31. These embodiments are discoveries of the present invention.

Also in accordance with the present invention, there is illustrated in FIG. 2 a door, gate, window, or lid 34 in at least a partially open position that may be in a conventional trunk lid 33 or possibly the only lid 34 to access the trunk of the vehicle 30, wherein the lid 34 is in or covers over a body frame 33. The doors, gates, window, or lids 32, 34, 36 provide access to either side, or vertical access from above, to the trunk 35 or back seat 37 that currently is not available. The door, gate, window, or lid 34 also provides a means for the vehicle 30 to carry and/or see cargo that currently cannot be viewed and/or transported in the vehicle 30 because the trunk lid 33 physically gets in the way.

Figure 8:
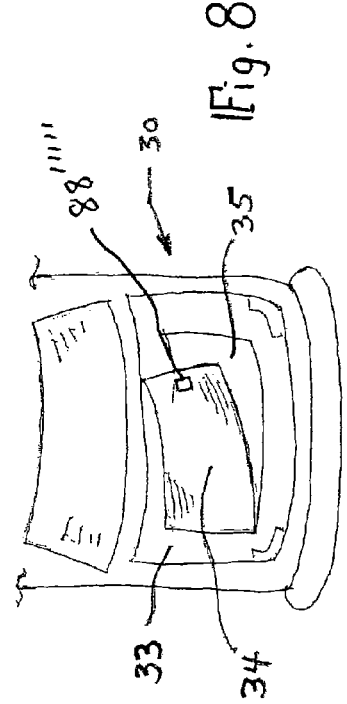
FIG. 8 is a top view of a trunk lid of FIG. 2.

As illustrated in FIG. 8, there is shown a top view of the trunk lid, door, gate, window, or lid 34 in a partially open position in trunk lid 34' or possible body frame 33 of vehicle 30, wherein the trunk 35 is exposed.

Note that the term "any openings of the present invention" is defined herein as including at least the doors, gates, windows, sunroof, or lids 21, 22, 23, 31, 32, 33, 34, 34', 36, 41a, 41b, 42, 44', 51a, 51b, 52, 53, 54, 55, 55', 56, 56a, 58, 58', 59, 59', 59'a, 61, 62, 63, 71, 72, 73, 73', 73", 73"', 74, 74', 74", 74"', 74"", 75, 75', 75", 75"', 76, 76', 78, 78', 77, 77', 77a, 80, 88"''', and/or 110.

Thus, any openings of the present invention may be realized as expandable/collapsible. That is, these doors, gates, window, sunroof, or lids may be as disclosed by Kimmet and incorporated by reference herein, in U.S. Pat. Nos. 6,378,592 and 6,648,047, and U.S. Application Publications 2002-0084042 and 2004-0055713. Further, any openings of the present invention may have decorative or descriptive permanent or removable panels as disclosed in Kimmet, which may incorporate electronic computer controlled displays or televisions.

Examples of such displays or televisions, but not limited to, are organic light emitting diode (OLED) or plasma displays, and flat screen displays of all kinds. Incorporated herein is a history (that began in 1936) of electron luminescence (available from Limate, Incorporated of Taipei, Taiwan R.O.C. that can be found on the World Wide Web at www.limate.com).

These doors, gates, windows, or lids could be used to display-on on the vehicles 20, 30, and 40, 50, 50', 60, 70, and 70' for computer and/or television purposes, or they could be used for decorative or advertisement purposes, for example, on taxi cabs, limos, and virtually all vehicles. Electrical connection to such displays would be conventional in the art and may be controlled by LINBUS and CANBUS protocol standards from the vehicle electronic control unit (ECU) 120, which may be per SAE (Society of Automotive Engineers) standards.

Any openings of the present invention may be realized as vehicle slider doors or windows, may or may not abut, may not have any windows in them at all, may be "doors-within-doors", "windows-within-windows", "windows-within-doors", or "doors-within-windows", may be realized as window doors (herein defined as a door comprising substantially a window, and/or any combination thereof. Further, it may be required that the door interlock 26 may be utilized to avoid conflict or damage between any openings of the present invention.

Figure 3:
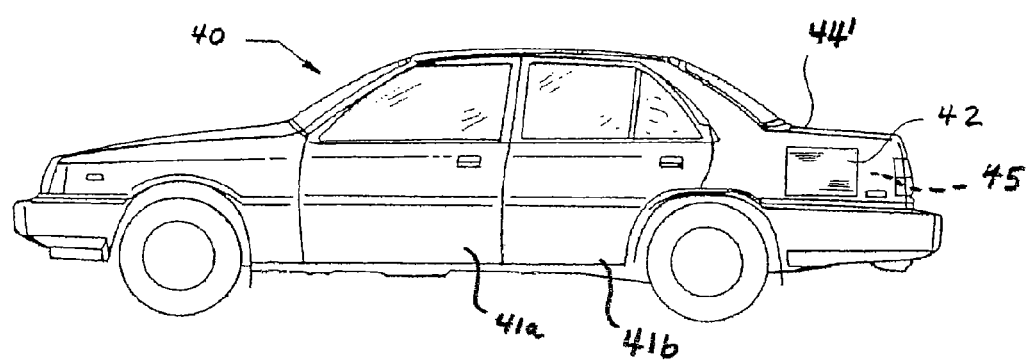
FIG. 3 is a side view of a four door automobile in accordance with the present invention.

FIG. 3 is directed to preferred embodiments of a four door automobile 40 having two doors 41a, 41b on each side. In accordance with the present invention, there is added to the vehicle 40 a side door, gate, window, or lid 42 to a trunk area 45 of the vehicle 40. The doors, gates, windows, or lids 42 provide side physical or visual access to the trunk 45 that currently is not available, much like the doors, gates, windows, or lids 32 of vehicle 30. Also, it is possible that an opening like the door 36 of FIG. 2 could be realized in doors 31, 41a, and/or 41b. These embodiments are discoveries of the present invention.

Figure 6A:
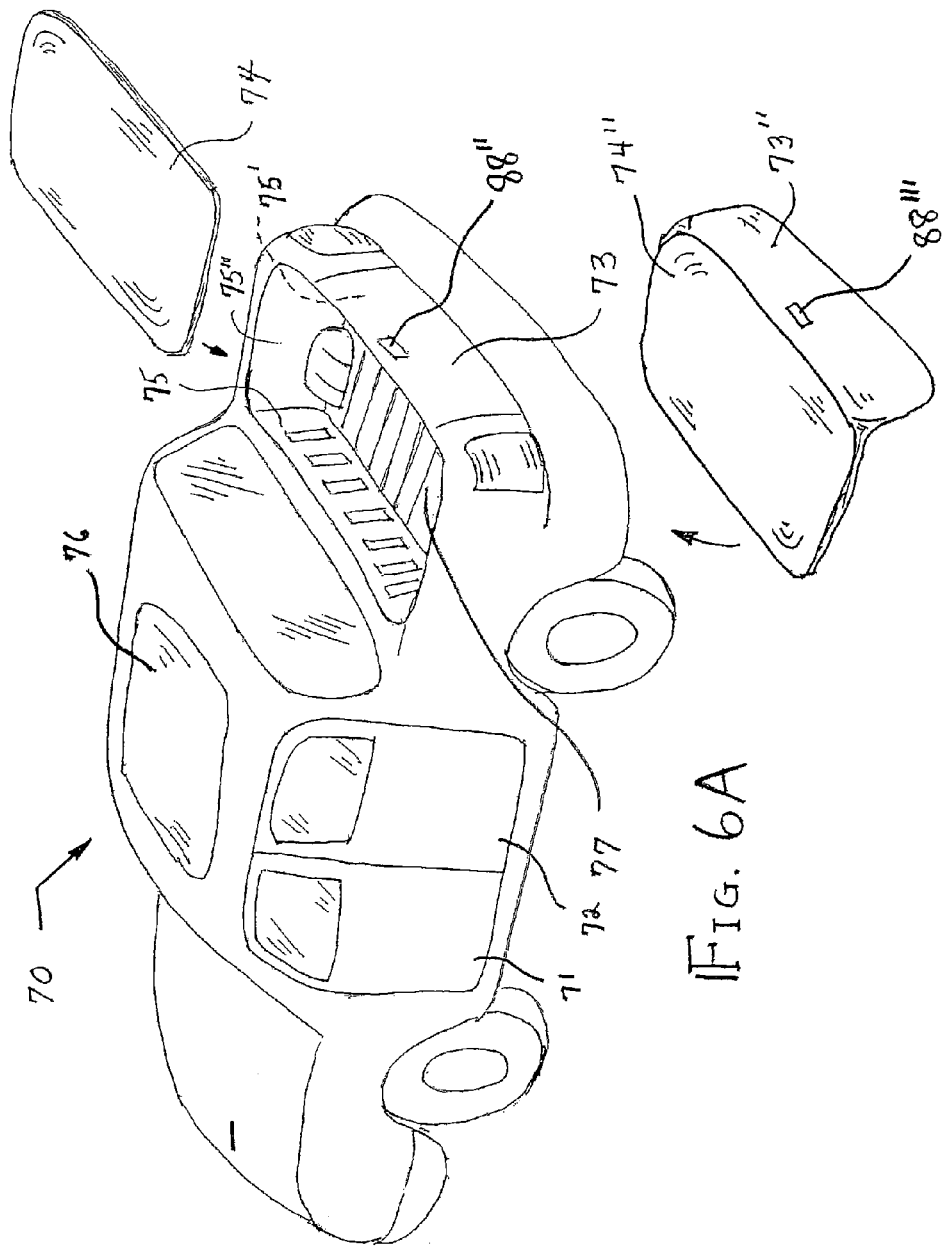
FIG. 6A is a perspective side-rear view of a vehicle having a trunk bed and a lid in accordance with the present invention.
Figure 6B:
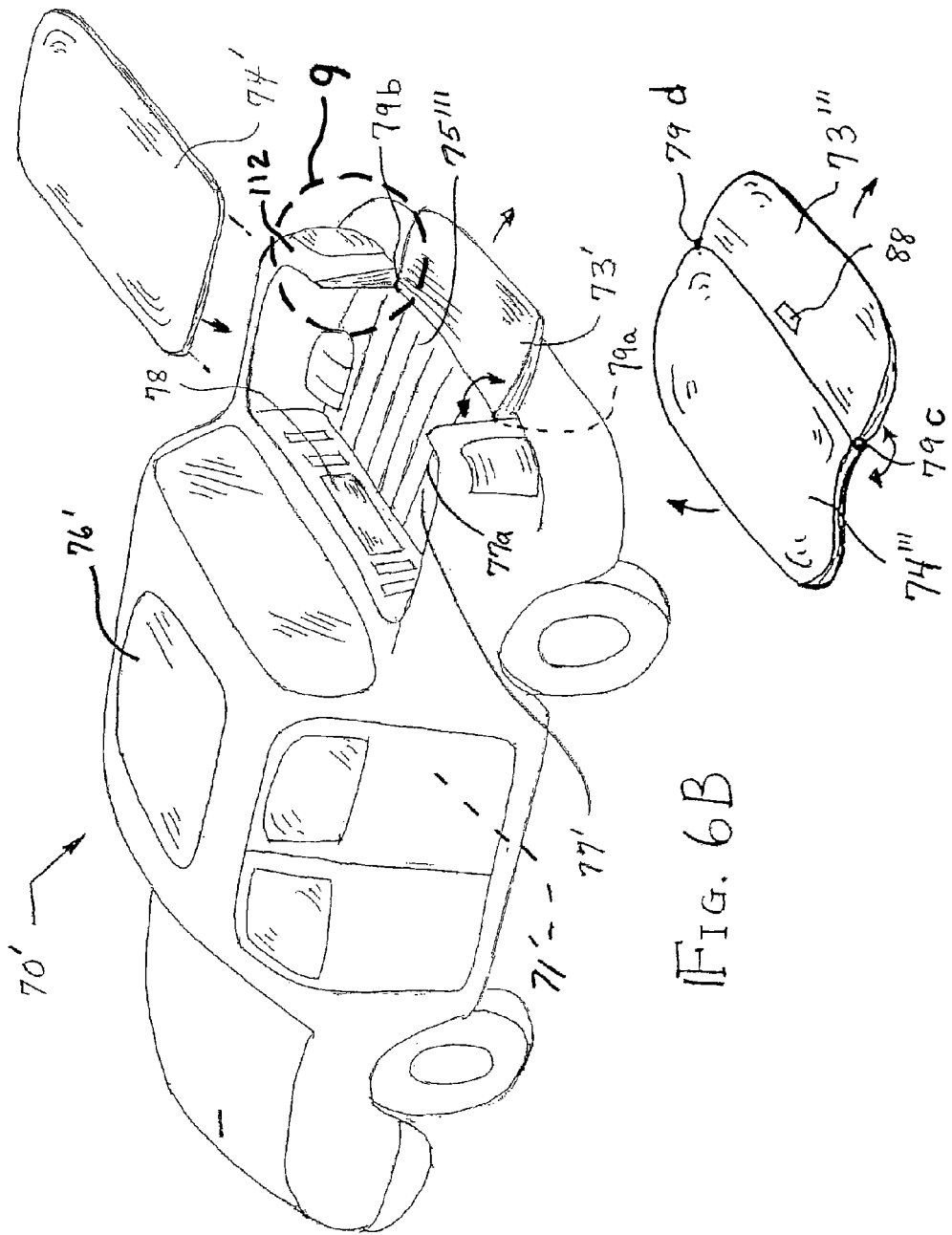
FIG. 6B is a perspective side-rear view of the vehicle of GA but having the trunk bed, gates, and lids in accordance with the present invention.

Another preferred embodiment of the present invention is realized when the trunk 35 or 45 of the conventional two door 30 or four door 40 vehicles are exposed by having trunk lids 34' or 44' removed or possibly by retracting the lids 34' or 44'. This discovery of the present invention could then provide a robust "trunk bed" similar to 57 and 57' of FIGS. 4A and 4B, thus, functionally providing hybrid two door or four door automobiles 70, 70', as shown in FIG. 6A-B, of two door or four door automobiles, like vehicles 30, 40. These trunk beds 77, 77' could provide hauling for tall or wide cargo, or for stone, debris, and Christmas trees, and the like kind of cargo, which would not be constrained by hauling or filling, as in the case of the conventional trunk lid 33.

Although not wishing to be limited to only the following example manufacturers and models of two door or four door automobiles, the two door or four door automobiles 30, 40, 70, 70' of the present invention possess the dimensional, design, and functional characteristics of the current (2005) models (which would be modified to have at least one of the embodiments of present invention): the Ford 500, Ford Taurus, Ford Crown Victoria, Ford Focus, Chevrolet Cavalier, Chevrolet Impala, and Chevrolet Monte Carlo. The two door or four door automobiles 30, 40, 70, 70' of the present invention are sedans.

The automobile term "sedan" has been applied to the automobiles 30, 40, 70, 70' (like those noted above for the Ford 500, Ford Taurus, Ford Crown Victoria, Ford Focus, Chevrolet Cavalier, Chevrolet Impala, and Chevrolet Monte Carlo) since at least the 1950's. An example of such a sedan is shown in prior art FIG. 10, where the 1959 Cadillac Sedan deVille 100 is illustrated. In fact, in at least the last two decades, the Ohio Bureau of Motor Vehicles (BMV) license plate registration cards indicate a four door Chevrolet Impala as being a "CHEV 4S", i.e., a Chevrolet four door sedan. Hence, the Ohio BMV would in the past and does now identify the vehicles 30, 40, 70, 70' as two or four door sedans.

Sedans are known to be of a fixed roof and herein a convertible roof type that extends vertically above the engine and trunk sections. Specifically, sedans are known to be passenger cars in a three-box configuration with A, B & C sections, as the sedan 100 in FIG. 10 is depicted. These sections are separate compartments where a front engine compartment A is vertically lower than a passenger compartment B, and a rear trunk cargo compartment C is also vertically lower than the passenger compartment B and covered with a sedan trunk lid, like trunk lid 74" in the lower inset of FIG. 6A. These sedan lids are typically hinged at pivots (see hinges 162, 164 in FIG. 9) at the top-forward portion of a trunk 75' on both sides and below the rear window (a.k.a. backlite), of the vehicle 70 depicted in FIG. 6A. Trunk lids 74, 74', 74"' are similarly hinged at the top-forward portion of a trunk 75', 75"' on both sides of their respective sedan 70, 70'.

Herein, these sections A, B, C apply to sedans and sedan portions illustrated in FIGS. 2, 3, 6A, 6B, 9, and 10, where sedans 30, 40, 70, 70', 100 and rear sections 112, 112' of sedan trunk compartments are shown. Vehicles 20, 50, 50' are not sedans, in fact vehicles 50, 50' are Chevrolet Avalanche pickup trucks. Vehicles 30, 40, 70, 70', 100 are not SUVs or pickup trucks. Also, the rear sections of the sedan trunk compartments 112, 112' are not parts of SUVs or pickup trucks.

In the sedans 30, 40, 70, 70', the passenger compartment B features two rows of seats and adequate passenger space in the rear of the passenger compartment B for adult passengers. The rear trunk cargo compartment C is in the rear of the sedan

30, 40, 70, 70', 100. The sedans 30, 40, 70, 70' are like the 1959 Cadillac Sedan DeVille 100 depicted in prior art FIG. 10 and are distinguished from the vehicles of FIGS. 1, 4A, 4B. Herein, a convertible is a sedan wherein the roof is removable, foldable, or lowerable.

The trunk beds 77, 77', of these hybrid two and four door automobiles 70, 70', could be conventional or they could be more robust, as mentioned above, where the trunk beds 77, 77' would be more like pick-up truck beds 57, 57', which are embossed, strengthen with high gage steel or plastic, or possible having ridges to make the trunk beds 77, 77' more strong.

A further discovery of the present invention is to provide a pivotable (at pivot points 79a, 79b) drop-down gate 73', as shown in FIG. 6B and indicated by the arcing double arrowhead line, in place of a conventional automobile fixed back panel 73 as shown in FIG. 6A, so that in effect the vehicles 30, 40 would function much like a current model pick-up truck or an SUV with a drop-down gate. The gate 73' could, conceivably, be removable, as indicated by the arrow pointing away from the vehicle 70'. The gate 73' could also, conceivably, be utilized with a conventional or robust trunk bed 77' (such as, metal ridges like those in a pick-up truck), with the removable/retractable lid 74', and/or with door, gate, window, or lid 78' that allows entry of material or passage of cargo into the rear of the vehicle 70' compartment 71'.

Note that the conventional automobile fixed back panel 73, as shown in FIG. 6A, may actually be a portion 73" of the lid 74", wherein if the lid 74" is removed, retracted, rolled up, etc., then the trunk 75' is exposed and able to handle cargo of larger size, for example, without being constricted by the lid 74".

In addition, referring to FIG. 6B there is also illustrated a trunk lid 74''' (that may or may not be removable as indicated by the arrow pointing away from the vehicle 70'), which is similar to the lid 74", except that the back panel 73''' is pivotably hinged at 79c and 79d. This embodiment would allow for the back panel 73''' to pivot up and allow various cargo to be carried in the trunk bed 77', which could have robust ridges 77a that could be embossed like those ridges 57a of a pick-up truck 50, and yet hang out beyond the rear of the vehicle 70', in a substantially horizontal orientation.

Figure 4A:
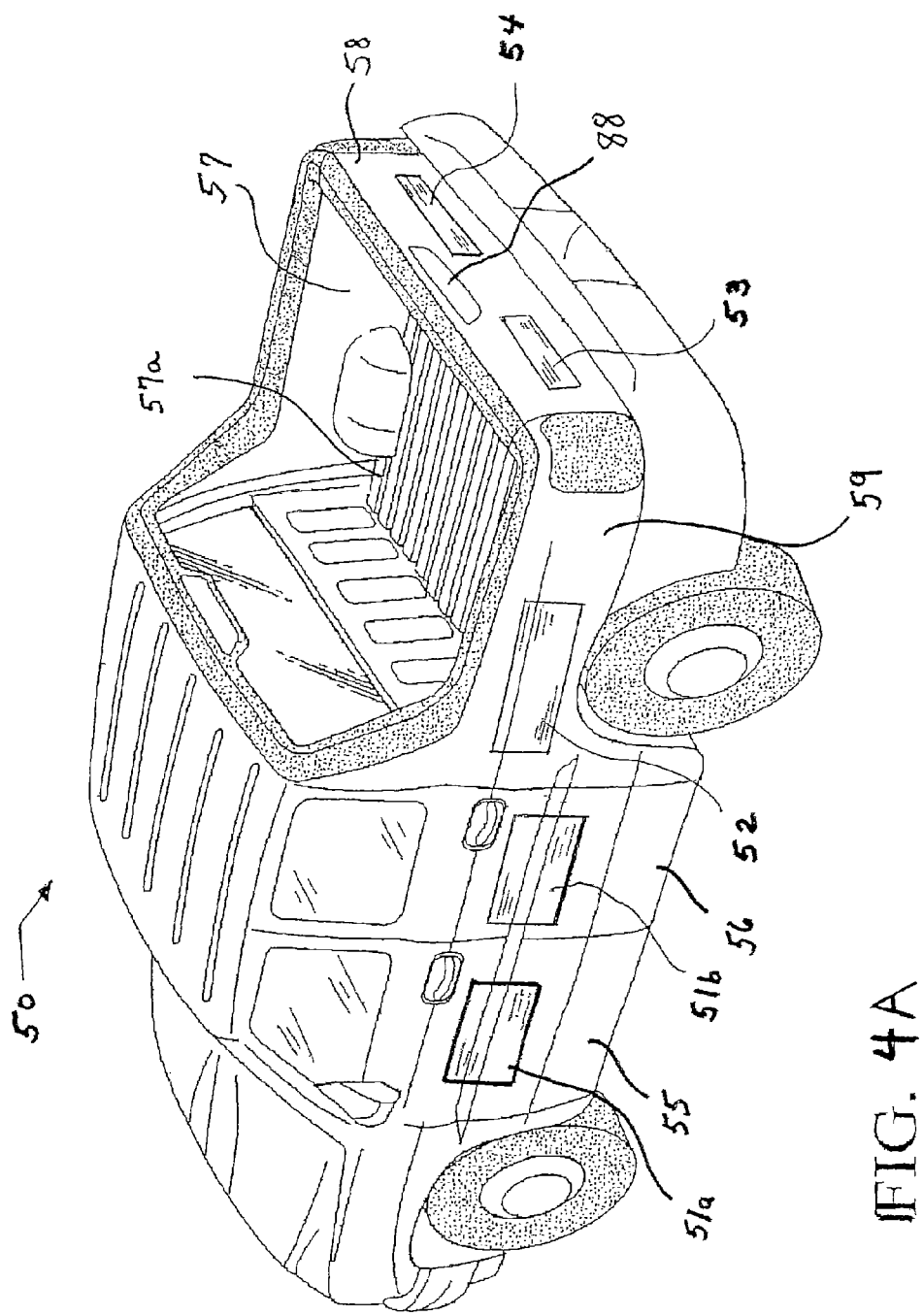
FIG. 4A is a perspective side-rear view of a pick-up truck having two doors on at least one side of the truck in accordance with the present invention.

Shown in FIG. 4A is the pick-up truck 50 having two doors on at least one side. In accordance with the present invention, there are added side doors, gates, windows, or lids 51a, 51b in either side doors 55, 56, also added is a side door, gate, window, or lid 52 in the side panel 59 of the truck bed 57, which has the robust channel ridges 57a. Added further are rear doors, gates, or lids 53, 54 to the rear gate 58. Note that the present invention is not limited by the number, shape, and/or size of the door(s), gate(s), window(s), sunroof(s), or lid(s), that have been added to the conventional sides, doors, gates, windows, or lids of the vehicles 20, 30, and 40, 50, 50', 60, 70, and 70'.

Figure 4B:
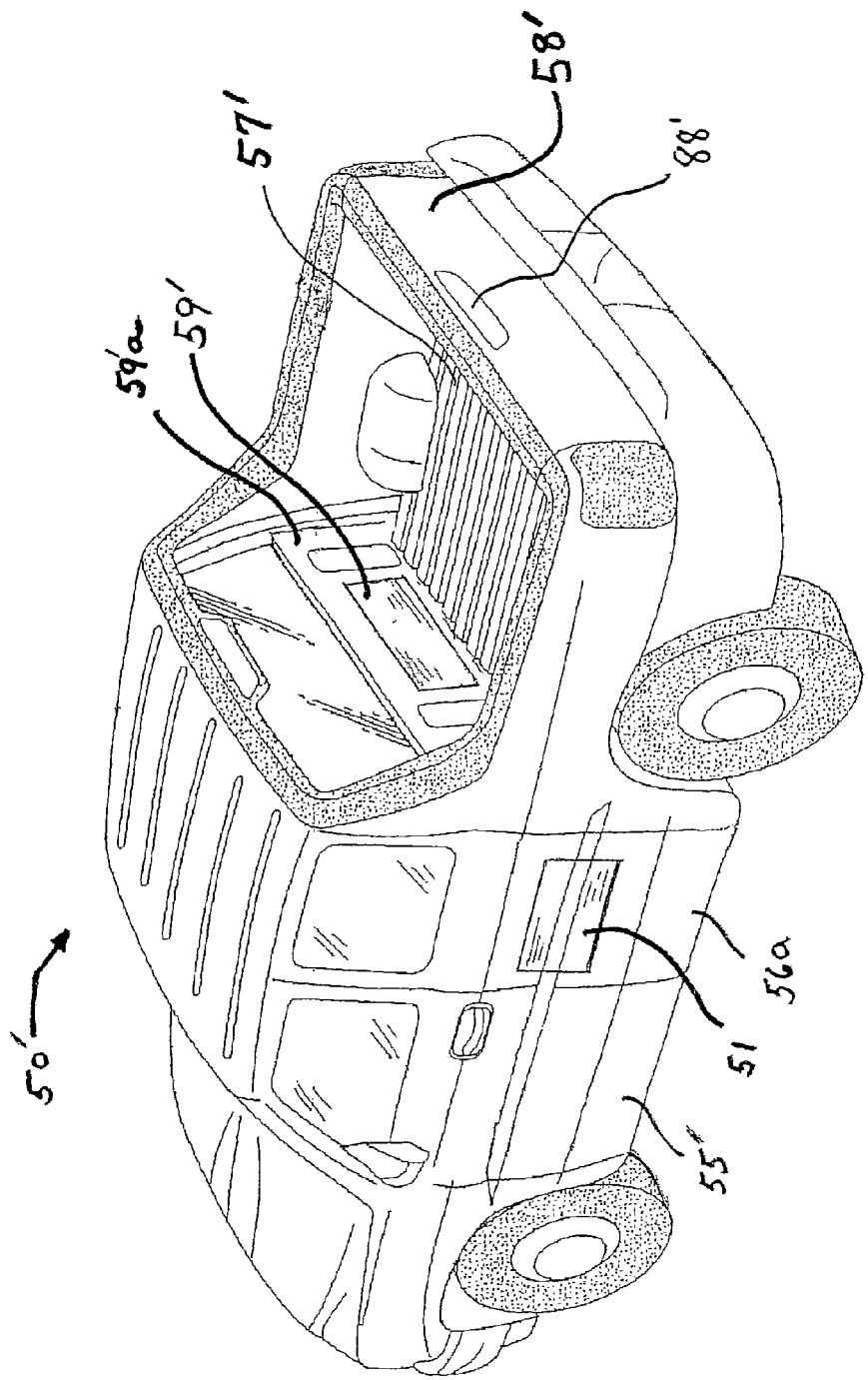
FIG. 4B is a perspective side-rear view of a pick-up truck having one door and an extended panel behind the door on at least one side of the truck in accordance with the present invention.

FIG. 4B illustrates pick-up 50' having one door 55' on at least one side of the vehicle 50'. Also shown is a panel 56a that has an added door, gate, window, or lid 51 that is a discovery that is in accordance with the present invention. In addition, the added door, gate, window, or lid 59' that is disposed in a rear vehicle body panel 59'a, which would allow access between the back portion of the pick-up truck and the bed of the truck 57'.

Although not wishing to be limited to only the following example manufacturers and models of pick-up trucks, the pick-up trucks 50, 50' of the present invention possess the dimensional, design, and functional characteristics of the current (2005) models (which would be modified to have at least one of the embodiments of present invention): the Ford Ranger, Ford 150 Series, Chevrolet Avalanche, Chevrolet Colorado, and Chevrolet Silverado.

Advantages of the openings 53, 54, 59' (as shown in FIGS. 4A-B) could be to carry lumber without "dropping" the gate 58, 58'. A use for the opening 52 might be to haul wide cargo or to gain access to material, a tool box, or tools that could be hauled in the bed 57 but may, for example, be locked up in the bed and/or covered by a cargo top (not shown).

Figure 5:
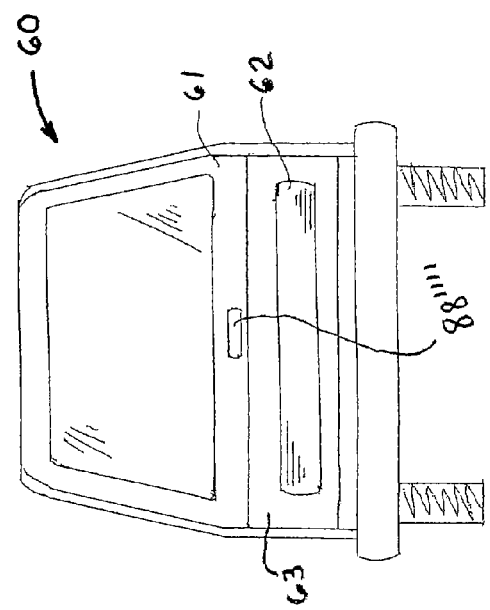
FIG. 5 shows a rear view of a vehicle in accordance with the present invention.

FIG. 5 shows a rear view of a vehicle 60 having a hatch, cargo top, door, or window 61 and a gate 63 that includes an added opening 62 in accordance with the present invention. An advantage to the opening 62 could be to carry wide cargo, for example, four foot wide sheets of paneling or drywall that are long in length. By having the opening 62, the gate 63 does not have to be left open during transportation of the cargo. This same added opening 62 could be applied to the gates 58, 58', and 73'-73''' of, respectively, the pick-ups 50, 50', or the hybrid automobiles 70' that are shown in FIG. 4A, 4B, or 6B. The added opening 62 could also be applied to the fixed back panels 73, 73" of the hybrid automobile 70 that are shown in FIG. 6A.

FIGS. 6A-B, respectively, illustrate the vehicles 70, 70' having the trunk lids 74, 74' that have been removed. It should be appreciated that the lids 74, 74' may collapse and expand as disclosed in the Kimmet references or roll or fold into the vehicle body panel at 75, 75', or 75" and still remain within the scope and spirit of the present invention. As a result, the vehicles 70, 70' provide easy access and cargo hauling capability that conventional two and four door automobiles of this type do not provide. The lids 74, 74' may be fixedly or removably attached over the trunk beds 77, 77'.

Figure 7:
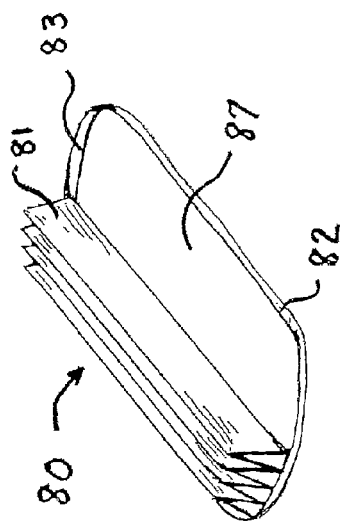
FIG. 7 is a perspective view of a collapsible/expandable lid/sunroof in accordance with the present invention.

FIG. 7 shows a collapsible/expandable trunk lid or sunroof 80 that could be attached fixedly or removably to vehicles 70, 70' of FIGS. 6A-B. As a trunk lid 80, the trunk lid 80 could be utilized in place of the trunk lids 74, 74' of FIGS. 6A-B. As a sunroof 80, the item 80 could be utilized in position of items 76, 76' of FIGS. 6A-B. The trunk lid 80 includes a trunk lid frame 82 that may have a track 83 for sliding the expandable/collapsible panels 81, which allows closing/opening of a trunk lid opening 87. The trunk lid opening 87 would allow access to the trunk beds 77, 77' when the panels 81 are collapsed and, therefore, deny access to the trunk beds 77, 77' when the panels 81 are expanded.

Any openings of the present invention may be realized with locks, hinges, spring-loaded hinges, latches, drop-down chains like those used on pick-up truck gates, slide mechanism, and other commonly used hardware (like screws, bolts, hasps, hasp rings, nuts, keys for locking, slides, and rivets) for such items.

FIG. 8 illustrates the trunk lid 34 of vehicle 30 shown in FIG. 2. The lid 34 may be the only trunk lid or it may be a lid-in-a-lid 33 or a lid-on-the-frame 33. The lid 34 may be fixedly or removably attached to the lid/frame 33 as above-mentioned.

Figure 9:
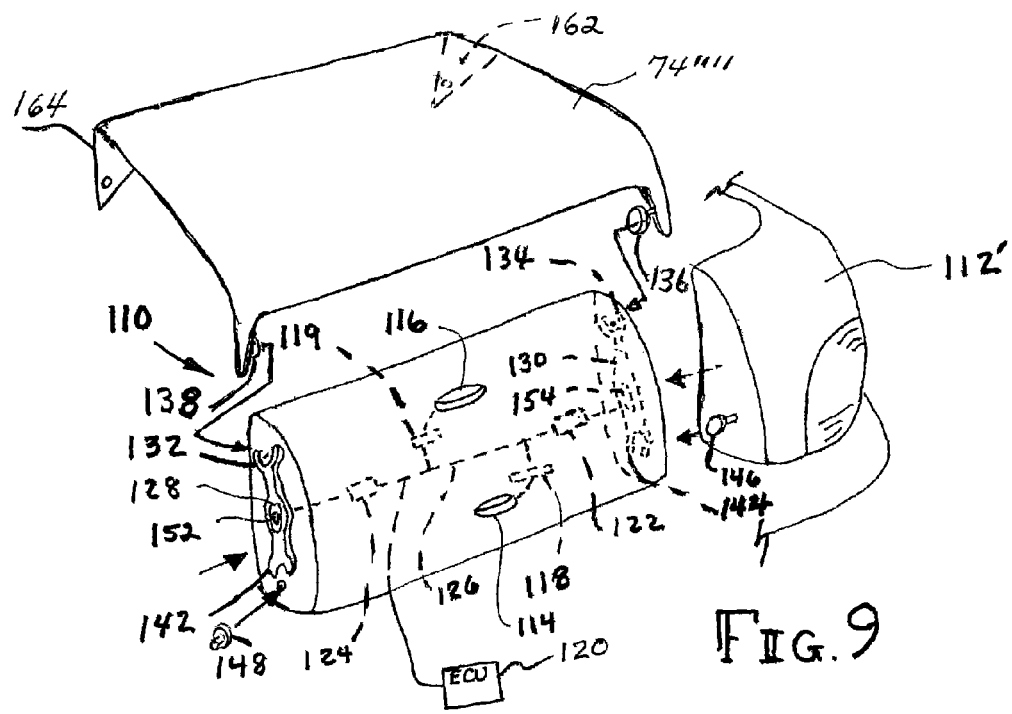
FIG. 9 is an exploded perspective view of a trunk lid and gate capable of being either raised or lowered in accordance with the present invention.
Figure 10:
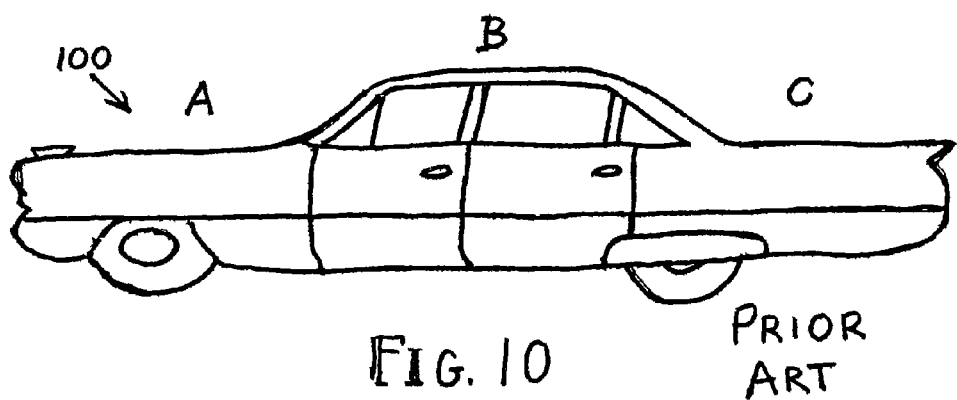
FIG. 10 is a side view of a prior art 1959 Cadillac Sedan deVille.

FIG. 9 depicts a sedan trunk gate 110 that can be utilized with the 2 or 4 door sedans 30, 40, 70, 70', where the sedan trunk gate 110 is shown being capable of cooperating with the rear section of a sedan trunk compartment 112' and a complementary sedan trunk compartment on the opposite side of the sedan (not shown but asymmetrically the same as the compartment 112'). The sedan trunk compartment 112' is similar to the sedan trunk compartment 112 that is shown in the dashed circular section 9 of FIG. 6B. The sedan trunk gate 110 is able to be raised automatically or manually.

To be automatically raised, a signal from the vehicle electronic control unit (ECU) 120 may be generated from within the vehicle compartment B by, for example, a driver or by way of a key fob that is commonly used to open conventional trunks. In order to manually raise the sedan trunk gate 110 a person can clasp the handle 114.

When raised manually or automatically, the trunk gate 110 would look like the sedan trunk back panel 73''' that is illustrated as being raised in the lower inset in FIG. 6B, when the lid 74'''' remains in a generally horizontal orientation. There, in the lower inset of FIG. 6B, the sedan trunk back panel 73''', which is pivotably hinged at 79c and 79d, is shown in a raised position, as the sedan trunk gate 110 would look, generally horizontally beyond the rear of the 2 or 4 door sedan 30, 40, 70, 70'. Whether raised manually or automatically, a pivotably attached lid 74'''' becomes attached to upper lid posts 138, 136 by way of upper forks 132, 134.

FIG. 9 also depicts the sedan trunk gate 110 being capable of cooperating with the rear section of the sedan trunk compartment 112'. In order for the sedan trunk gate 110 to be lowered, a signal is generated from the vehicle electronic control unit 120 or from a clasping of the handle 116. This signal would result in the sedan trunk gate 110 being lowered as the sedan trunk drop-down gate 73' in FIG. 6B illustrates. Another signal from the ECU 120 could, on the other hand, be raised as the sedan trunk back panel 73''' is depicted in the lower inset of FIG. 6B.

Specifically, FIG. 9 shows a way in which lowering/raising the sedan trunk gate 110 could be controlled, although other means are possible. First, if the sedan trunk gate 110 is to be lowered, then a signal would be generated from clasping the upper handle 116 that is in electrical or mechanical communication with an upper linkage 119 or from the ECU 120 that is in electrical communication with the upper linkage 119, which is in electrical or mechanical communication with relay mechanisms 122, 124 via a cross line 126 that is in electrical or mechanical communication with the clasping arms 128, 130, so that the clasping arms 128, 130 are adapted to be in a lowered position with the lower forks 142, 144 to clasp their corresponding lower pivot posts 148, 146 in pivotable contact. Here the right lower pivot post 146 is physically shown as part of the sedan trunk compartment 112'. The left pivot post 148 is shown but not attached to an asymmetrical compartment section to compartment section 112', in order to best see how the left pivot post 148 could cooperate with the left lower fork 142.

Conversely, if the sedan trunk gate 110 is to be raised, then a signal would be generated from clasping the lower handle 114 that is in electrical or mechanical communication with a lower linkage 118 or from the ECU 120 that is in electrical communication with the lower linkage 118, which is in electrical or mechanical communication with the relay mechanisms 122, 124 via the cross line 126 that is in electrical or mechanical communication with the clasping arms 128, 130, so that the clasping arms 128, 130 are adapted to be in a raised position with the upper forks 132, 134 to clasp their corresponding upper pivot lid posts 138, 136 in pivotable contact. Here the right upper pivot lid post 136 and the left upper pivot lid post 138 are shown cooperating with the upper forks 134, 132.

The upper lid posts 136, 138 and forks 134, 132 function to raise the sedan trunk gate 110, while being attached to the trunk lid 74''''. The arrow going from right to left at the right upper pivot lid post 136 indicates that the right upper pivot post 136 could be in pivotable contact with the right upper fork 134. The left upper pivot lid post 138 and the left upper fork 132 could also be in pivotable contact. Consequently, these pivotable contacts allow the sedan trunk gate 110 to be raised.

The lower posts 146, 148 and forks 144, 142 function to lower the sedan trunk gate 110. The arrow going from right to left at the right lower pivot post 146 indicates that the right lower pivot post 146 could be in pivotable contact with the right lower fork 144. The left lower pivot post 148 (which would be positioned at a similar position on the left side of the asymmetrical sedan portion like portion 112') could be in pivotable contact with the left lower fork 142, like their corresponding parts 146, 144. Consequently, these pivotable contacts would allow the sedan trunk gate 110 to be lowered, much like the sedan trunk drop-down gate 73' is depicted in FIG. 6B.

As also shown in FIG. 9, the clasping arms 128, 130 are moved up in slots 152, 154 by the relay mechanisms 122, 124 for raising the sedan trunk gate 110, but would be lowered in slots 152, 154 by the relay mechanisms 122, 124 for lowering the sedan trunk gate 110.

The gate 110 may be removable wherein the ECU 120 would signal the clasping arms 128, 130 to slide in their slots 152, 154 toward the middle areas between the forks 132, 134, 142, 144 and the posts 136, 138, 146, 148, so that the forks 132, 134, 142, 144 could not clasp the pivot posts 136, 138, 146, 148. Hence, allowing the sedan trunk gate 110 to be removed.

The lid-in-a-lid 33 or the lid-on-the-frame 33 may be applied to the lids 74, 74', 74'', 74''', 74''''. The door, gate, window, or lid 32 may be applied to the gates 73, 73', 73'', 73''', 110. The side door, gate, window, or lid 42 may be applied to trunk areas 112, 112'. The collapsible/expandable trunk lid 80 may be applied to the lids 74, 74', 74'', 74''', 74''''.

SUVs, minivans, and pickup trucks, like those depicted in FIGS. 1, 4A, 4B, and 5 are known to provide much utility to owners, for example, for hauling cargo. Unfortunately, this utility comes at the expense of low vehicle miles per gallon, which translates into using more gasoline, diesel fuel, and other energy resources and, consequently, more pollution with the emission of more greenhouse gases.

In addition, this utility of the SUVs, minivans, and pickup trucks comes at a time when energy costs are very high and purchase prices for SUVs and trucks are also very high. Using more resources for larger vehicles that use more energy per miles traveled is a detriment to the quality of the environment and a waste of money in general. Currently, the world is in need of more "green" vehicles and more conservation of the world's energy resources. Experts in the fields of the environment, energy, vehicle design, and the economy are looking for ways to reduce this waste of the world's energy resources and to lower costs of the vehicles so as to provide better ways for societies to function on a global scale.

On the other hand, current sedans do not provide the utility for hauling cargo like SUVs and pickup trucks. However, with the above detailed sedan trunk lids 34, 74, 74', 74'', 74''', 74'''', 78, gates 73, 73', 73'', 73''', 110, trunk beds 77, 77', ridges 77a, and body panels 75, 75'', the present invention provides significant additional utility at a significantly lower initial purchase price for a sedan when compared to SUVs, minivans, and pickup trucks. In addition, the 2 or 4 door sedans 30, 40, 70, 70' of the present invention with at least these features 34, 74, 74', 74'', 74''', 74'''', 78, 73, 73', 73'', 73''', 110, 77, 77', 77a, 75, 75', 75'', 75''' can provide this utility with lower continual energy operating expenditures (e.g., better miles per gallon or miles per electrical charge) and consequently less greenhouse emissions, when compared to SUVs and trucks.

Other capabilities that the features 32, 34, 42, 45, 53, 54, 59'a, 62, 74, 74', 74'', 74''', 74'''', 78, 73, 73', 73'', 73''', 110, 77, 77', 77a, 75, 75', 75'', 75''', 80, 88''''' of the present invention provide by way of the 2 or 4 door sedans 30, 40, 70, 70' of the present invention, which are not currently being provided, are the ability to provide fold down and hinged rear doors for tailgate parties that are currently only provided by SUVs, minivans, pickup trucks, and other utility vehicles. Such trunk gates 73, 73', 110 and lids 34, 74, 74', 74", 74''', 74'''', 78 allow for food and other items to rest horizontally for access at tail gate parties at sporting events, picnics, and other family recreational activities. Also, the pop up trunk gates 73''', 110 provide an "umbrella" effect to block moisture or sunlight when popped up and extended like SUV and minivan rear doors, which is not currently available to sedans.

These capabilities are provided without a higher purchase price that comes with larger utility vehicles and without the higher operating costs that comes with larger utility vehicles. At the same time, such sedans 30, 40, 70, 70' of the present invention retain their stature as family cars, with more luxury than SUVs and pickup trucks, and these vehicles 30, 40, 70, 70' can fit into smaller parking spots (lending to conservation of land) and smaller garages (lending to conservation of building supplies).

These 2 or 4 door sedans 30, 40, 70, 70' are more practical vehicles, while having lower profiles, and are considered more as urban and suburban vehicles as opposed to work, utility, transport (like minivans), or country vehicles. And yet, the features 32, 34, 42, 45, 53, 54, 59'*a*, 62, 74, 74', 74", 74''', 74'''', 78, 73, 73', 73", 73''', 110, 77, 77', 77*a*, 75, 75', 75", 75''', 80, 88''''' if applied to sedans 30, 40, 70, 70' of the present invention, can provide significant amounts of utility that are not currently available to current sedans.

In other words, this invention provides a path to change the paradigm and mindset that bigger is better. Instead, a more streamlined vehicle can provide better gas and charge mileage and much utility without detracting from the environment and wasting valuable resources. As a result of using more sedans, manufacturers can better meet higher mileage standards that are being proposed.

As an example, it is difficult to haul yard waste to proper landfills or to transport a lawn mower, a step ladder, 4 feet by 8 feet sheets of paneling, or other wide, long, heavy, bulky, or dirty items in current sedans. Much time and money is wasted by having such items transported from one place to another by means other than by a sedan, which better thought of in many social circles as a "family car" than say a pickup truck. However, with these features 32, 34, 42, 45, 53, 54, 59'*a*, 62, 74, 74', 74", 74''', 74'''', 78, 73, 73', 73", 73''', 110, 77, 77', 77*a*, 75, 75', 75", 75''', 80, 88''''' the 2 or 4 door sedans 30, 40, 70, 70' of the present invention would in and of themselves be capable of providing these capabilities.

Very importantly, by providing the above-mentioned capabilities to the 2 or 4 door sedans 30, 40, 70, 70' of the present invention, vehicle owners are much less likely to own multiple vehicles since they would retain the capabilities of sedans and yet be able to take on many of the utility capabilities of SUVs, minivans, and pickup trucks. As a result of the sedans 30, 40, 70, 70' of the present invention, there will be less overall money spent on vehicles, fewer vehicles will be purchased, less storage will be needed for vehicles, lower insurance costs due to fewer vehicles being perceived as needed, with less pollution and release of greenhouse gases being realized.

More sedans compared to the combined numbers of SUVs, minivans, and pickup trucks translates into a higher overall miles/gallon or miles/per charge for the entire population of vehicles. This should be a major goal of our society. The present invention will significantly contribute to diminishing the mindset that more powerful and bigger vehicles is a good thing for our society.

Also, there will be fewer vehicles on the roads, there will be fewer vehicles to block vision when backing out of parking spots, there will be better vision while driving since the overall view has less space being taken up by bigger and wider utility vehicles, and there would be fewer accidents, deaths, and lower health care costs associated with any accident, to name a few.

In some groups the vehicular mindset has become "Survival of the Biggest and Most Powerful." To some degree, a sedan with the utility capabilities of the bigger and powerful SUVs, minivans, and pickup trucks will help in changing this wasteful mindset.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A sport utility vehicle, comprising:
   two front wheels aligned across a sport utility vehicle;
   two rear wheels aligned across the sport utility vehicle;
   a side door disposed from over a rear portion of one of the rear wheels toward a rear of the sport utility vehicle for access into and out of the sport utility vehicle from a side of the sport utility vehicle.

2. The sport utility vehicle of claim 1, wherein the side door is disposed on the passenger side of the sport utility vehicle.

3. The sport utility vehicle of claim 1, wherein the side door is disposed on the driver side of the sport utility vehicle.

4. The sport utility vehicle of claim 1, further comprising another side door disposed from over a rear portion of the other rear wheel toward a rear of the sport utility vehicle for access into and out of the sport utility vehicle from the other side of the sport utility vehicle.

5. The sport utility vehicle of claim 1, wherein the side door has an interlock capable of assuring that the side door and another door on that side of the sport utility vehicle do not interfere with one another.

6. The sport utility vehicle of claim 1, wherein the side door is capable of sliding open and closed.

7. The sport utility vehicle of claim 1, wherein the side door is capable of exposing both the rear and middle interior portion of the sport utility vehicle.

8. The sport utility vehicle of claim 1, wherein the side door is hinged and capable of pivoting away from the vehicle.

9. The sport utility vehicle of claim 1, wherein the side door comprises a window.

10. The sport utility vehicle of claim 1, wherein the side door comprises a gate or lid.

11. The sport utility vehicle of claim 1, wherein the side door comprises a step or running board.

12. The sport utility vehicle of claim 1, wherein the side door comprises a latch capable of being locked.

13. The sport utility vehicle of claim 1, wherein the sport utility vehicle selected from the group consisting of a Ford Escape, Ford Expedition, Ford Excursion, Chevrolet Blazer, Chevrolet Trail Blazer, Dodge Durango, Ford Freestar, Chevrolet Astro, Chevrolet Venture, Ford E-Series, Chevrolet Express, and their equivalent vehicles.

14. A sport utility vehicle comprising the dimensional, design, and functional characteristics of anyone of the sport utility vehicles of claim 13.

15. The sport utility vehicle of claim 1, wherein the side door is capable of expanding, folding, retracting, rolling, swinging upwardly, coiling, being spring loaded, moving up or down and away from the sport utility vehicle, moving back to front, moving front to back, coming off of the sport utility vehicle, or being displayed-on.

16. The sport utility vehicle of claim 1, wherein the side door selected from the group consisting of a decorative panel, descriptive panel, permanent panel, removable panel, an electronic computer controlled display, a television, light emitting diode, a plasma display, a flat screen display, an advertisement display, a LINBUS control unit, a CANBUS control unit, a slider door, and a slider panel.

17. The sport utility vehicle of claim 1, wherein the side door selected from the group consisting of a door within a door, a window within a window, a window within a door, a door within a window, and a window.

* * * * *